United States Patent
Jaffe et al.

(10) Patent No.: US 7,471,731 B2
(45) Date of Patent: Dec. 30, 2008

(54) PHY SUB-CHANNEL PROCESSING

(75) Inventors: Steven Jaffe, Irvine, CA (US); Stephen Edward Krafft, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 8 days.

(21) Appl. No.: 11/832,530

(22) Filed: Aug. 1, 2007

(65) Prior Publication Data

US 2008/0019465 A1    Jan. 24, 2008

Related U.S. Application Data

(63) Continuation of application No. 10/420,089, filed on Apr. 22, 2003, now Pat. No. 7,266,155.

(60) Provisional application No. 60/388,987, filed on Jun. 14, 2002.

(51) Int. Cl.
*H04L 5/12* (2006.01)

(52) U.S. Cl. ........................................ 375/261

(58) Field of Classification Search ............... 375/148, 375/150, 260–262, 264, 340–343; 455/296; 370/509, 512, 514
See application file for complete search history.

(56) References Cited

U.S. PATENT DOCUMENTS

| | | | |
|---|---|---|---|
| 6,973,296 B2* | 12/2005 | Webster et al. | 455/296 |
| 2003/0031265 A1* | 2/2003 | Friedman | 375/260 |
| 2007/0036176 A1* | 2/2007 | Quigley et al. | 370/468 |

* cited by examiner

*Primary Examiner*—Don N Vo
(74) *Attorney, Agent, or Firm*—Garlick Harrison & Markison; Shayne X. Short

(57) ABSTRACT

Physical layer (PHY) sub-channel processing. A soft symbol decision stream is arranged into a number of sub-channels to reduce substantially the processing performed within a communication receiver on data that is not intended for that communication receiver. In other embodiments, a predetermined approach is employed to arrange the soft symbol decision stream into one or more frames; each frame may have one or more soft symbol blocks; and each soft symbol block may have one or more symbols. Each of the soft symbol blocks, within a frame, may be assigned to a sub-channel. Only the soft symbol blocks that contain information destined for the communication receiver need be decoded. Only the sub-channel that includes these soft symbol blocks, destined for this communication receiver, need be decoded. The soft symbol blocks not within the sub-channel may be discarded thereby recovering some of the processing capabilities of the communication receiver.

20 Claims, 22 Drawing Sheets

Embodiment of PHY Sub-Channel Processing

High Definition Television (HDTV) Communication System 200

Cellular Communication System 300

Cellular Communication System 400

Microwave Communication System 500

Point-to-Point Radio Communication System 600

Uni-directional Communication System 700

Bi-directional Communication System 800

One to Many Communication System 900

Satellite Receiver Set-Top Box System 1000

Embodiment of PHY Sub-Channel Processing Functionality

Embodiment of a Receiver Arranged to Support PHY Sub-Channel Processing

Embodiment of PHY Sub-Channel Processing

Embodiment of PHY Sub-Channel Processing

Embodiment of Info. Coded within Soft Symbol Blocks of a Sub-Channel and Programmable Look Ahead Embodiment of Info. Coded within Soft Symbol Blocks of a Sub-Channel Embodiment of Code Rates Employed to Decode SSBs of Sub-Channel Embodiment of Code Rates Employed to Decode SSBs of Sub-Channel Embodiment of Modulations (Constellations and Mappings) for Code Rates 1 and n Embodiment of PHY Sub-Channel Selection of a Video Broadcast Signal 2000

Sub-Channel Processing Method 2200

PHY SUB-CHANNEL PROCESSING

CROSS REFERENCE TO RELATED PATENTS/PATENT APPLICATIONS

Continuation priority claim, 35 U.S.C. §120

The present U.S. Utility Patent Application claims priority pursuant to 35 U.S.C. § 120, as a continuation, to the following U.S. Utility Patent Application which is hereby incorporated herein by reference in its entirety and made part of the present U.S. Utility Patent Application for all purposes:

1. U.S. Utility application Ser. No. 10/420,089, entitled "PHY sub-channel processing,", filed Apr. 22, 2003, pending, which claims priority pursuant to 35 U.S.C. § 119(e) to the following U.S. Provisional Patent Application which is hereby incorporated herein by reference in its entirety and made part of the present U.S. Utility patent application for all purposes:

a. U.S. Provisional Application Ser. No. 60/388,987, "PHY sub-channel processing,", filed Jun. 14, 2002.

BACKGROUND OF THE INVENTION

1. Technical Field of the Invention

The invention relates generally to communication systems; and, more particularly, it relates to receiver processing within communication systems.

2. Description of Related Art

Data communication systems have been under continual development for many years. There is oftentimes a design motivation to increase the speed of processing, at both ends of a communication channel, to be as fast as possible in an effort to maximize throughput within the system. In a typical communication receiver application that receives a multiple access signal, such as a broadcast signal, there is a lot of received data that is processed and never used. As an example, in a broadcast system, a communication receiver will typically decode all of the data of a received channel before selecting and extracting the data specifically appropriate for that communication receiver.

A typical such communication receiver may often be described as follows: a signal is received from a communication channel. A demodulator will take this received signal and calculate soft symbol decisions of received symbols of that received signal. These soft symbol decisions, in a stream format, are then passed to a decoder that generates hard decisions from those soft symbol decisions that are then output from the decoder in a bit stream format. This bit stream may then be passed onto some higher level applications that will then determine which portions of the bit stream are destined for this communication receiver. Those portions of the bit stream that are not intended for this communication receiver may then be discarded. In this situation, a lot of processing is performed on portions the received signal that are never used. This prior art approach is inherently consumptive of the processing capabilities of the communication receiver, in that, a great deal of processing is performed on data that is received, but not necessarily intended to be used, by the communication receiver.

Therefore, there exists a need in the art for a more efficient way to perform processing of received data that will be less consumptive of the communication receiver's processing capabilities without suffering degradation in performance.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

FIGS. 1-9 illustrate a number of communication system context embodiments where certain aspects of the invention may be implemented.

Figure 1:
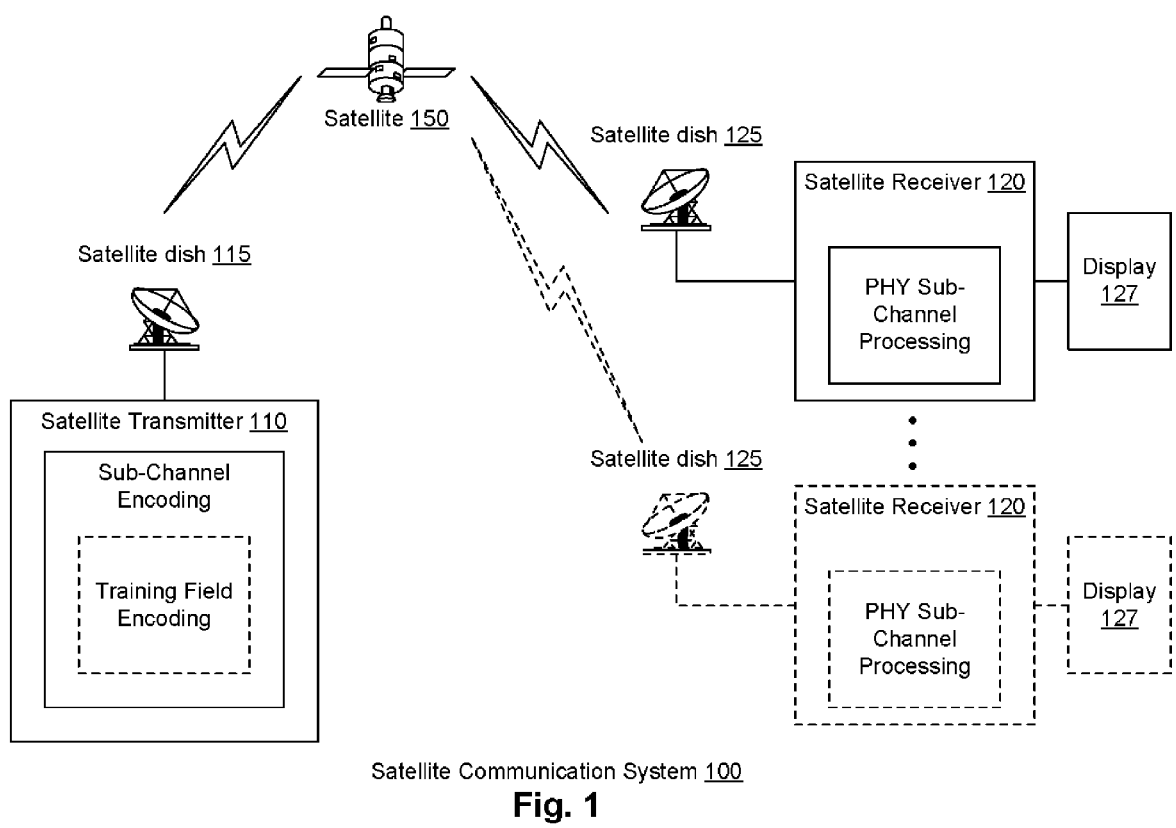
FIG. 1 is a system diagram illustrating an embodiment of a satellite communication system that is built according to the present invention.

FIG. 1 is a system diagram illustrating an embodiment of a satellite communication system 100 that is built according to the present invention. A satellite transmitter 110 is operable to support sub-channel encoding. This sub-channel encoding may also be performed when doing training field encoding. In other embodiments, a training field is transmitted from the satellite transmitter 110 without undergoing any encoding. The sub-channel encoding may be performed using any one of several possible embodiments that are described herein. The sub-channel encoding encodes data that is to be transmitted by the satellite transmitter 110. The satellite transmitter 110 is communicatively coupled to a satellite dish 115 that is operable to communicate with a satellite 150. The satellite transmitter 110 may also be communicatively coupled to a wired network. This wired network may include any number of networks including the Internet, proprietary networks, and other wired networks. The satellite transmitter 110 employs the satellite dish 115 to communicate to the satellite 150 via a wireless communication channel. The satellite 150 is able to communicate with one or more satellite receivers, shown as satellite receiver(s) 120 (each having a satellite dish 125).

Each of the one or more satellite receiver(s) 120 is operable to support physical layer (PHY) sub-channel processing according to the invention. Each of the satellite receiver(s) 120 may be viewed as corresponding to a subscriber of the services provided by the satellite transmitter 110. Each of the satellite receiver(s) 120 may also be communicatively coupled to a display, shown as display(s) 127. Various and further details will be provided below regarding the various embodiments by which PHY sub-channel processing may be performed according to the invention.

Here, the communication to and from the satellite 150 may cooperatively be viewed as being a wireless communication channel, or each of the communication to and from the satellite 150 may be viewed as being two distinct wireless communication channels.

For example, the wireless communication "channel" may be viewed as not including multiple wireless hops in one embodiment. In other embodiments, the satellite 150 receives a signal received from the satellite transmitter 110 (via its satellite dish 115), amplifies it, and relays it to one or more of the satellite receiver(s) 120 (via its respective satellite dish 125); any one of the satellite receiver(s) 120 may also be implemented using terrestrial receivers such as satellite receivers, satellite based telephones, and satellite based Internet receivers, among other receiver types. In the case where the satellite 150 receives a signal received from the satellite transmitter 110 (via its satellite dish 115), amplifies it, and relays it, the satellite 150 may be viewed as being a "transponder." In addition, other satellites may exist that perform both receiver and transmitter operations in cooperation with the satellite 150 up in space. In this case, each leg of an up-down transmission via the wireless communication channel would be considered separately.

In whichever embodiment, the satellite 150 communicates with one or more of the satellite receiver(s) 120. One or more of the satellite receiver(s) 120 may be viewed as being a mobile unit in certain embodiments (employing a local antenna); alternatively, one or more of the satellite receiver(s) 120 may be viewed as being a satellite earth station that may be communicatively coupled to a wired network in a similar manner in which the satellite transmitter 110 may also be communicatively coupled to a wired network. The FIG. 1 shows one of the many embodiments where PHY sub-channel processing may be performed according to any one or more of the various embodiments of the invention. It is noted that this PHY sub-channel processing includes both sub-channel encoding at a transmitter end of a communication channel, as well as PHY sub-channel processing at the receiver end of the communication channel.

Figure 2:
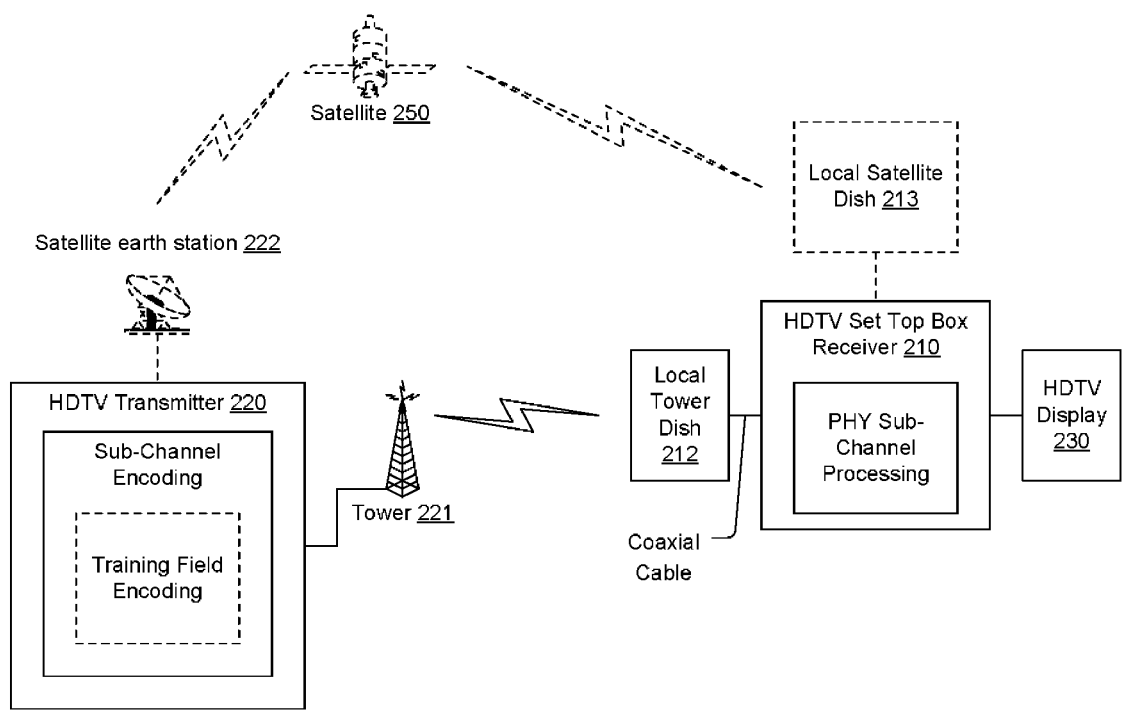
FIG. 2 is a system diagram illustrating an embodiment of a high definition television (HDTV) communication system that is built according to the present invention.

FIG. 2 is a system diagram illustrating an embodiment of a high definition television (HDTV) communication system 200 that is built according to the present invention. An HDTV transmitter 220 is communicatively coupled to a tower 221. The HDTV transmitter 220, using its tower 221, transmits a signal to a local tower dish 212 via a wireless communication channel. The local tower dish 212 communicatively couples to an HDTV set top box receiver 210 via a coaxial cable. The HDTV set top box receiver 210 includes the functionality to receive the wireless transmitted signal that has been received by the local tower dish 212; this may include any transformation and/or down-converting as well to accommodate any up-converting that may have been performed before and during transmission of the signal from the HDTV transmitter 220 and its tower 221.

The HDTV set top box receiver 210 is also communicatively coupled to an HDTV display 230 that is able to display the demodulated and decoded wireless transmitted signals received by the HDTV set top box receiver 210 and its local tower dish 212. The HDTV transmitter 220 (via its tower 221) transmits a signal directly to the local tower dish 412 via the wireless communication channel in this embodiment. In alternative embodiments, the HDTV transmitter 220 may first receive a signal from a satellite 250, using a satellite earth station 222 that is communicatively coupled to the HDTV transmitter 220, and then transmit this received signal to the to the local tower dish 212 via the wireless communication channel. In this situation, the HDTV transmitter 220 operates as a relaying element to transfer a signal originally provided by the satellite 250 that is destined for the HDTV set top box receiver 210. For example, another satellite earth station may first transmit a signal to the satellite 250 from another location, and the satellite 250 may relay this signal to the satellite earth station 222 that is communicatively coupled to the HDTV transmitter 220. The HDTV transmitter 220 performs receiver functionality and then transmits its received signal to the local tower dish 212.

In even other embodiments, the HDTV transmitter 220 employs the satellite earth station 222 to communicate to the satellite 250 via a wireless communication channel. The satellite 250 is able to communicate with a local satellite dish 213; the local satellite dish 213 communicatively couples to the HDTV set top box receiver 210 via a coaxial cable. This path of transmission shows yet another communication path where the HDTV set top box receiver 210 may communicate with the HDTV transmitter 220.

In whichever embodiment and whichever signal path the HDTV transmitter 220 employs to communicate with the HDTV set top box receiver 210, the HDTV set top box receiver 210 is operable to receive communication transmissions from the HDTV transmitter 220.

The HDTV transmitter 220 includes an embodiment of the sub-channel encoding as described above. This may also include training field encoding as well, as also mentioned above. The FIG. 2 shows yet another of the many embodiments where PHY sub-channel processing may be performed according to any one or more of the various embodiments of the invention. It is noted that this PHY sub-channel processing includes both sub-channel encoding at a transmitter end of a communication channel, as well as PHY sub-channel processing at the receiver end of the communication channel.

Figure 3:
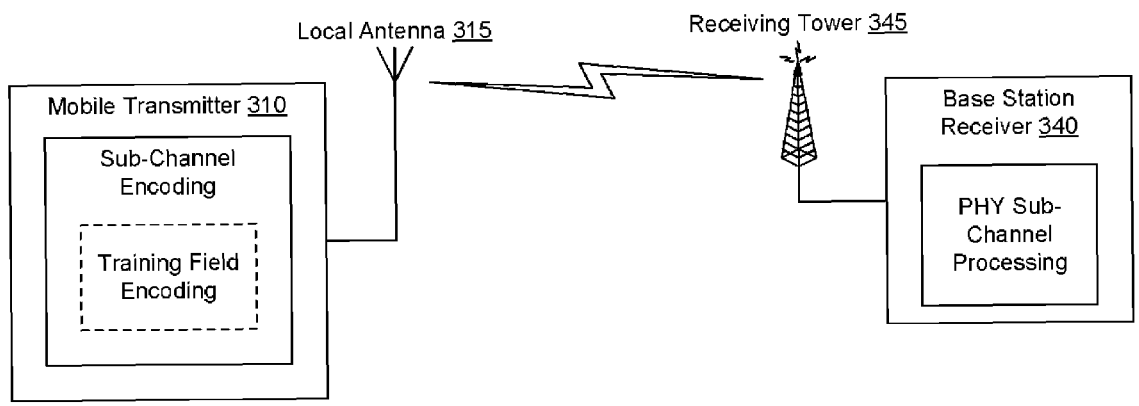
FIG. 3 is a system diagram illustrating an embodiment of a cellular communication system that is built according to the present invention.

FIG. 3 is a system diagram illustrating an embodiment of a cellular communication system 300 that is built according to the present invention. A mobile transmitter 310 includes a local antenna 315 communicatively coupled thereto. The mobile transmitter 310 may be any number of types of transmitters including a cellular telephone, a wireless pager unit, a mobile computer having transmit functionality, or any other type of mobile transmitter. The mobile transmitter 310 transmits a signal, using its local antenna 315, to a receiving tower 345 via a wireless communication channel. The receiving tower 345 is communicatively coupled to a base station receiver 340; the receiving tower 345 is operable to receive data transmission from the local antenna 315 of the mobile transmitter 310 that have been communicated via the wireless communication channel. The receiving tower 345 communicatively couples the received signal to the base station receiver 340.

The mobile transmitter 310 is operable to support sub-channel encoding. This sub-channel encoding may also be performed when doing training field encoding. In other embodiments, a training field is transmitted from the mobile transmitter 310 without undergoing any encoding. The sub-channel encoding may be performed using any one of several possible embodiments that are described herein. The base station receiver 340 is operable to support PHY sub-channel processing according any one of the various embodiments of the invention described herein.

The FIG. 3 shows yet another of the many embodiments where PHY sub-channel processing may be performed according to any one or more of the various embodiments of the invention. It is noted that this PHY sub-channel processing includes both sub-channel encoding at a transmitter end of a communication channel, as well as PHY sub-channel processing at the receiver end of the communication channel.

Figure 4:
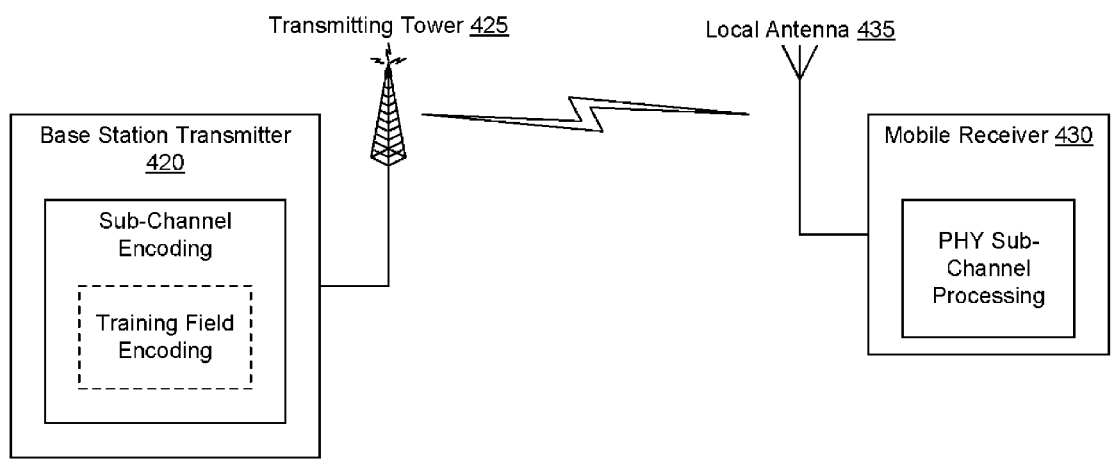
FIG. 4 is a system diagram illustrating another embodiment of a cellular communication system that is built according to the present invention.

FIG. 4 is a system diagram illustrating another embodiment of a cellular communication system 400 that is built according to the present invention. From certain perspectives, the cellular communication system 400 of the FIG. 4 may be viewed as being the reverse transmission operation of the cellular communication system 300 of the FIG. 3. A base station transmitter 420 is communicatively coupled to a transmitting tower 425. The base station transmitter 420, using its transmitting tower 425, transmits a signal to a local antenna 435 via a wireless communication channel. A mobile receiver 430 includes the local antenna 435 communicatively coupled thereto. The local antenna 435 is communicatively coupled to a mobile receiver 430 so that the mobile receiver 430 may receive transmission from the transmitting tower 435 of the base station transmitter 420 that have been communicated via the wireless communication channel. The local antenna 435 communicatively couples the received signal to the mobile receiver 430. It is noted that the mobile receiver 430 may be any number of types of receivers including a cellular telephone, a wireless pager unit, a mobile computer having receive functionality, or any other type of mobile receiver.

The base station transmitter 420 is operable to support sub-channel encoding. This sub-channel encoding may also be performed when doing training field encoding. In other embodiments, a training field is transmitted from the base station transmitter 420 without undergoing any encoding. The sub-channel encoding may be performed using any one of several possible embodiments that are described herein. The mobile receiver 430 is operable to support PHY sub-channel processing according any one of the various embodiments of the invention described herein.

The FIG. 4 shows yet another of the many embodiments where PHY sub-channel processing may be performed according to any one or more of the various embodiments of the invention. It is noted that this PHY sub-channel processing includes both sub-channel encoding at a transmitter end of a communication channel, as well as PHY sub-channel processing at the receiver end of the communication channel.

Figure 5:
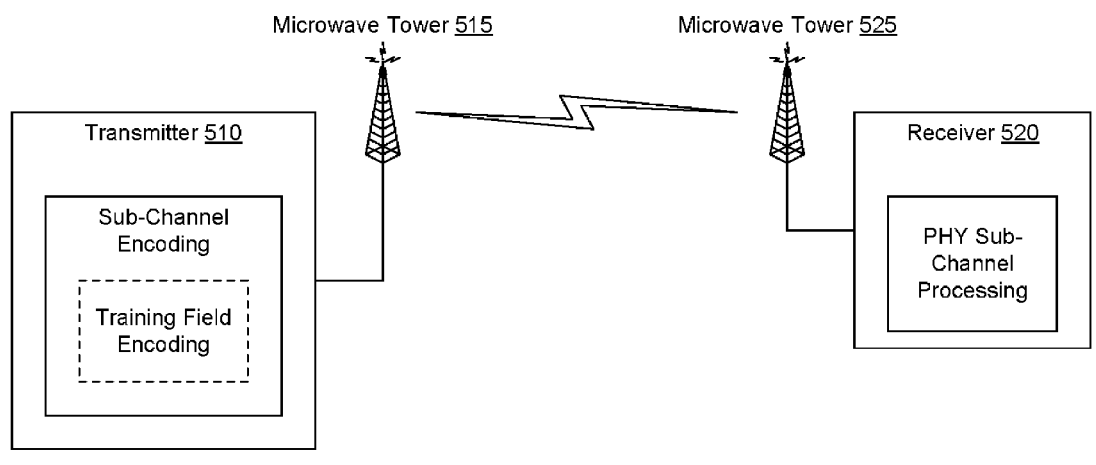
FIG. 5 is a system diagram illustrating an embodiment of a microwave communication system that is built according to the present invention.

FIG. 5 is a system diagram illustrating an embodiment of a microwave communication system 500 that is built according to the present invention. A transmitter 510 is communicatively coupled to a microwave tower 515. The transmitter 510, using its microwave tower 515, transmits a signal to a microwave tower 525 via a wireless communication channel. A receiver 520 is communicatively coupled to the microwave tower 525. The microwave tower 525 is able to receive transmissions from the microwave tower 515 that have been communicated via the wireless communication channel.

The transmitter 510 is operable to support sub-channel encoding. This sub-channel encoding may also be performed when doing training field encoding. In other embodiments, a training field is transmitted from the transmitter 510 without undergoing any encoding. The sub-channel encoding may be performed using any one of several possible embodiments that are described herein. The receiver 520 is operable to support PHY sub-channel processing according any one of the various embodiments of the invention described herein.

The FIG. 5 shows yet another of the many embodiments where PHY sub-channel processing may be performed according to any one or more of the various embodiments of the invention. It is noted that this PHY sub-channel processing includes both sub-channel encoding at a transmitter end of a communication channel, as well as PHY sub-channel processing at the receiver end of the communication channel.

Figure 6:
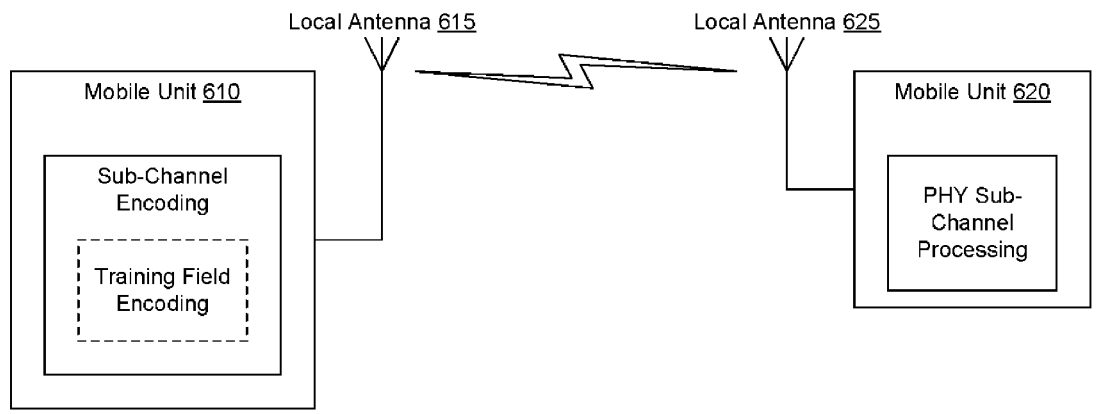
FIG. 6 is a system diagram illustrating an embodiment of a point-to-point radio communication system that is built according to the present invention.

FIG. 6 is a system diagram illustrating an embodiment of a point-to-point radio communication system 600 that is built according to the present invention. A mobile unit 610 includes a local antenna 615 communicatively coupled thereto. The mobile unit 610, using its local antenna 615, transmits a signal to a local antenna 625 via a wireless communication channel. A mobile unit 620 includes the local antenna 625 communicatively coupled thereto. The mobile unit 620 may receive transmissions from the mobile unit 610 that have been communicated via the wireless communication channel.

The mobile unit 610 is operable to support sub-channel encoding. This sub-channel encoding may also be performed when doing training field encoding. In other embodiments, a training field is transmitted from the mobile unit 610 without undergoing any encoding. The sub-channel encoding may be performed using any one of several possible embodiments that are described herein. The mobile unit 620 is operable to support PHY sub-channel processing according any one of the various embodiments of the invention described herein.

It is also noted that the point-to-point radio communication system 600 may also support bi-directional communication where each of the mobile units 610 and 620 may transmit/receive communication from each other. In this case, each of the mobile units 610 and 620 is operable to support both The FIG. 6 shows yet another of the many embodiments where PHY sub-channel processing may be performed according to any one or more of the various embodiments of the invention. It is noted that this PHY sub-channel processing includes both sub-channel encoding at a transmitter end of a communication channel, as well as PHY sub-channel processing at the receiver end of the communication channel.

Figure 7:
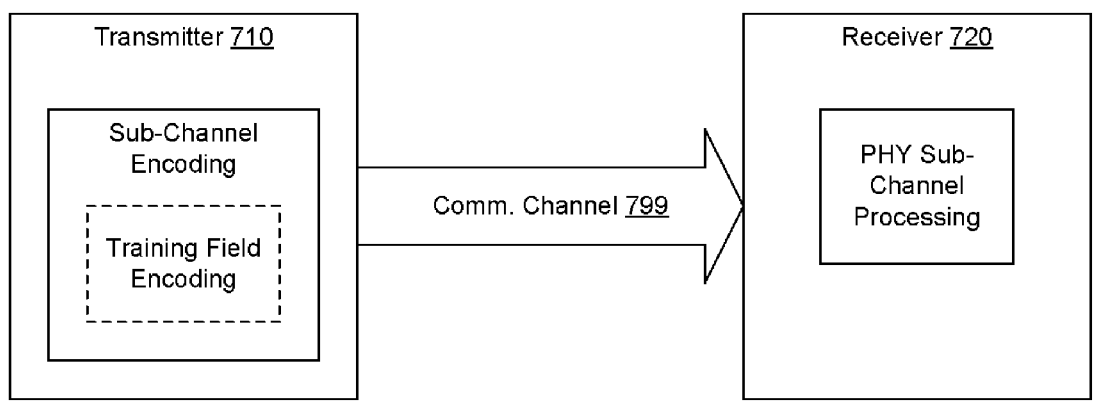
FIG. 7 is a system diagram illustrating an embodiment of a uni-directional communication system that is built according to the present invention.

FIG. 7 is a system diagram illustrating an embodiment of a uni-directional communication system 700 that is built according to the present invention. A transmitter 710 communicates with a receiver 720 via a uni-directional communication channel 799. The uni-directional communication channel 799 may be a wireline (or wired) communication channel or a wireless communication channel without departing from the scope and spirit of the invention. The wired media by which the uni-directional communication channel 799 may be implemented are varied, including coaxial cable, fiber-optic cabling, and copper cabling, among other types of "wiring." Similarly, the wireless manners in which the uni-directional communication channel 799 may be implemented are also varied, including satellite communication, cellular communication, microwave communication, and radio communication, among other types of wireless communication.

The transmitter 710 is operable to support sub-channel encoding. This sub-channel encoding may also be performed when doing training field encoding. In other embodiments, a training field is transmitted from the transmitter 710 without undergoing any encoding. The sub-channel encoding may be performed using any one of several possible embodiments that are described herein. The receiver 720 is operable to support PHY sub-channel processing according any one of the various embodiments of the invention described herein.

The FIG. 7 shows yet another of the many embodiments where PHY sub-channel processing may be performed according to any one or more of the various embodiments of the invention. It is noted that this PHY sub-channel processing includes both sub-channel encoding at a transmitter end of a communication channel, as well as PHY sub-channel processing at the receiver end of the communication channel.

Figure 8:
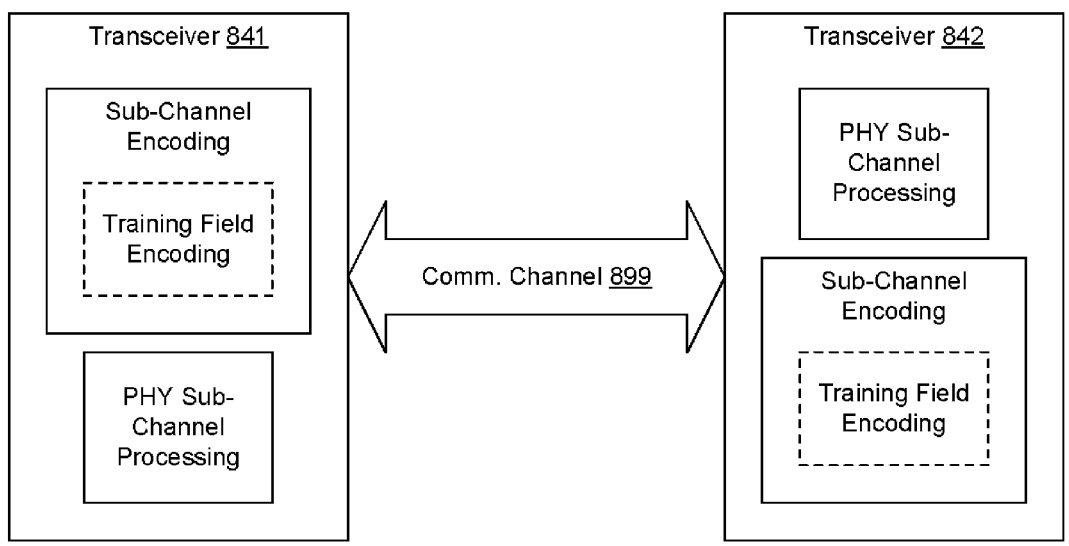
FIG. 8 is a system diagram illustrating an embodiment of a bi-directional communication system that is built according to the present invention.

FIG. 8 is a system diagram illustrating an embodiment of a bi-directional communication system 800 that is built according to the present invention. A transceiver 841 and a transceiver 842 are able to communicate with one another via a bi-directional communication channel 899. The bi-directional communication channel 899 may be a wireline (or wired) communication channel or a wireless communication channel without departing from the scope and spirit of the invention. The wired media by which the bi-directional communication channel 899 may be implemented are varied, including coaxial cable, fiber-optic cabling, and copper cabling, among other types of "wiring." Similarly, the wireless manners in which the bi-directional communication channel 899 may be implemented are varied, including satellite communication, cellular communication, microwave communication, and radio communication, among other types of wireless communication.

The transceiver 841 is operable to support sub-channel encoding. This sub-channel encoding may also be performed when doing training field encoding. In other embodiments, a training field is transmitted from the transceiver 841 without undergoing any encoding. The sub-channel encoding may be performed using any one of several possible embodiments that are described herein. The transceiver 842 is operable to support PHY sub-channel processing according any one of the various embodiments of the invention described herein.

Similarly, to support the bi-directional functionality of the invention, the transceiver 842 is operable to support sub-channel encoding. This sub-channel encoding may also be performed when doing training field encoding. In other embodiments, a training field is transmitted from the transceiver 842 without undergoing any encoding. The sub-channel encoding may be performed using any one of several possible embodiments that are described herein. The transceiver 841 is also operable to support PHY sub-channel processing according any one of the various embodiments of the invention described herein.

The FIG. 8 shows yet another of the many embodiments where PHY sub-channel processing may be performed according to any one or more of the various embodiments of the invention. It is noted that this PHY sub-channel processing includes both sub-channel encoding at a transmitter end of a communication channel, as well as PHY sub-channel processing at the receiver end of the communication channel. This PHY sub-channel processing may also be viewed as being performed to support the reverse communication across the bi-directional communication channel 899.

Figure 9:
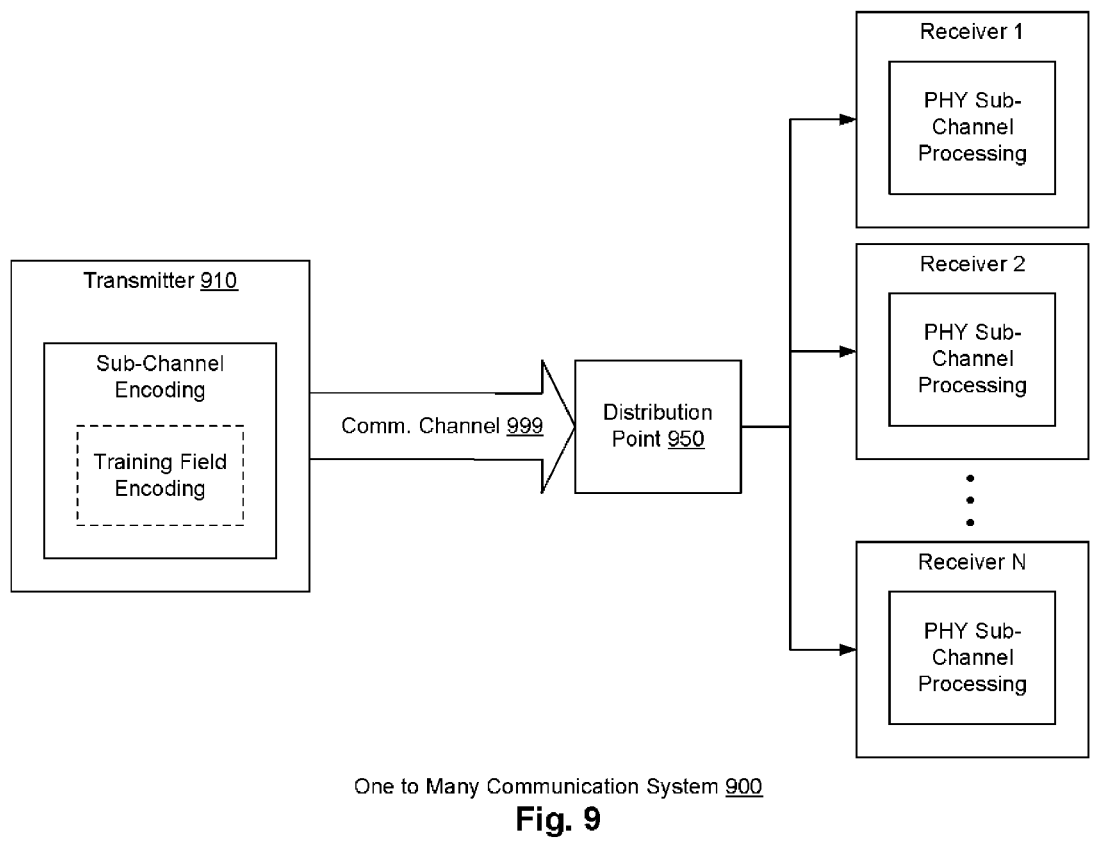
FIG. 9 is a system diagram illustrating an embodiment of a one to many communication system that is built according to the present invention.

FIG. 9 is a system diagram illustrating an embodiment of a one to many communication system 900 that is built according to the present invention. From certain perspectives, this one to many communication system 900 may be viewed as being a broadcast communication system. A transmitter 910 is able to communicate, via broadcast in certain embodiments, with a number of receivers, shown as receiver(s) 1, 2, . . . , and 3 via a uni-directional communication channel 999. Each of the receiver(s) 1, 2, . . . , and 3 may be viewed as being associated with a subscriber that receives services provided by the transmitter 910. The uni-directional communication channel 999 may be a wireline (or wired) communication channel or a wireless communication channel without departing from the scope and spirit of the invention. The wired media by which the uni-directional communication channel 999 may be implemented are varied, including coaxial cable, fiber-optic cabling, and copper cabling, among other types of "wiring." Similarly, the wireless manners in which the uni-directional communication channel 999 may be implemented are varied, including satellite communication, cellular communication, microwave communication, and radio communication, among other types of wireless communication.

A distribution point 950 is employed within the one to many communication system 900 to provide the appropriate communication to the receiver(s) 1, 2, . . . , and 3. In certain embodiments, the receivers (receivers) 1, 2, . . . , and 3) each receive the same communication and individually discern which portion of the total communication is intended for themselves. The processing of this received information, be each of the receiver(s) 1, 2, . . . , and 3, is substantially improved and performed in a more efficient manner by employing the PHY sub-channel processing according to the invention.

The transmitter 910 is operable to support sub-channel encoding. This sub-channel encoding may also be performed when doing training field encoding. In other embodiments, a training field is transmitted from the transmitter 910 without undergoing any encoding. The sub-channel encoding may be performed using any one of several possible embodiments that are described herein. The receivers) 1, 2, . . . , and 3 are each operable to support PHY sub-channel processing according any one of the various embodiments of the invention described herein.

The FIG. 9 shows yet another of the many embodiments where PHY sub-channel processing may be performed according to any one or more of the various embodiments of the invention. It is noted that this PHY sub-channel processing includes both sub-channel encoding at a transmitter end of a communication channel, as well as PHY sub-channel processing at the receiver end of the communication channel.

Figure 10:
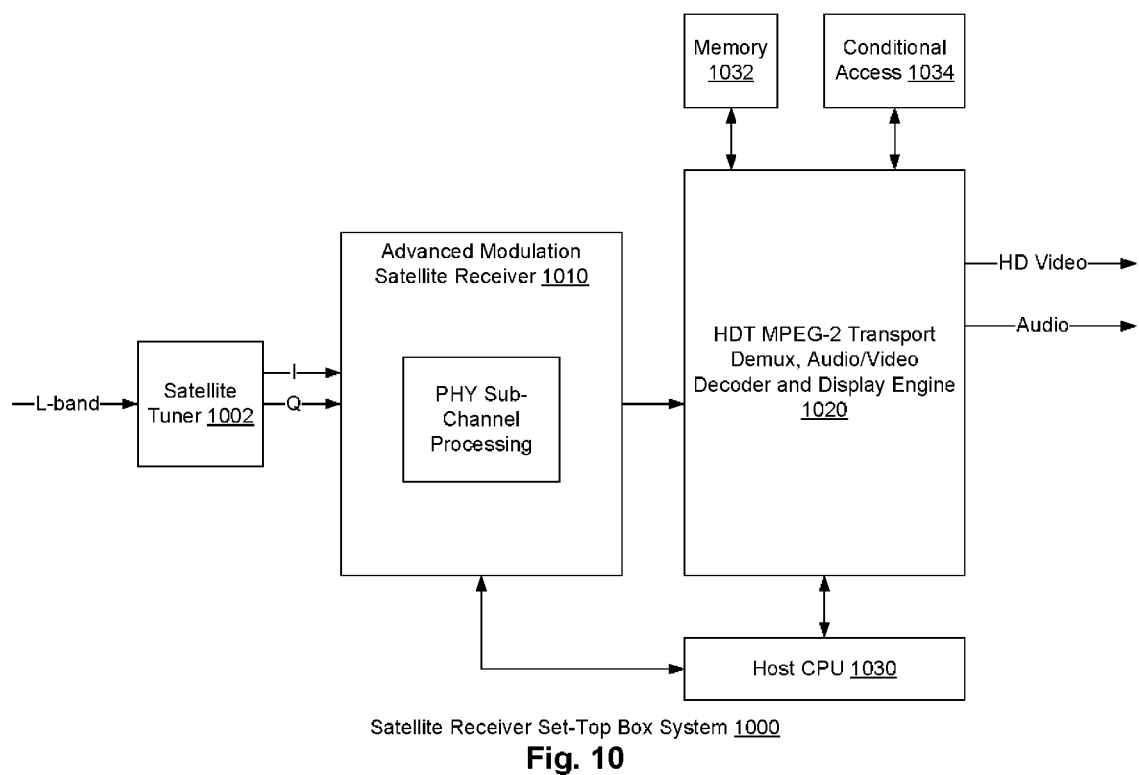
FIG. 10 is a system diagram illustrating an embodiment of a satellite receiver set-top box receiver system that is built according to the present invention.

FIG. 10 is a system diagram illustrating an embodiment of a satellite receiver set-top box receiver system 1000 that is built according to the present invention. The satellite receiver set-top box system 1000 includes an advanced modulation satellite receiver 1010 that is implemented in an all digital architecture. The satellite receiver set-top box system 1000 includes a satellite tuner 1002 that receives a signal via the L-band. The satellite tuner 1002 extracts I,Q (in-phase and quadrature) components from a signal received from the L-band and provides them to the advanced modulation satellite receiver 1010. The advanced modulation satellite receiver 1010 is operable to support PHY sub-channel processing according to the invention. The advanced modulation satellite receiver 1010 communicatively couples to an HDTV MPEG-2(Motion Picture Expert Group) transport de-mux, audio/video decoder and display engine 1020. Both the advanced modulation satellite receiver 1010 and the HDTV MPEG-2 transport de-mux, audio/video decoder and display engine 1020 communicatively couple to a host central processing unit (CPU) 1030. The HDTV MPEG-2 transport de-mux, audio/video decoder and display engine 1020 also communicatively couples to a memory module 1032 and a conditional access functional block 1034. The HDTV MPEG-2 transport de-mux, audio/video decoder and display engine 1020 provides HD video and audio output that may be provided to an HDTV display.

The advanced modulation satellite receiver 1010 is a single-chip digital satellite receiver supporting PHY sub-channel processing according to the invention. Several of the many embodiments of the variable code rate operation are described in even more detail below. The advanced modulation satellite receiver 1010 is operable to receive communication provided to it from a transmitter device according to the invention. The code rate may be viewed as being the ratio of the number of information bits within a symbol over the total number of bits within a symbol.

Figure 11:
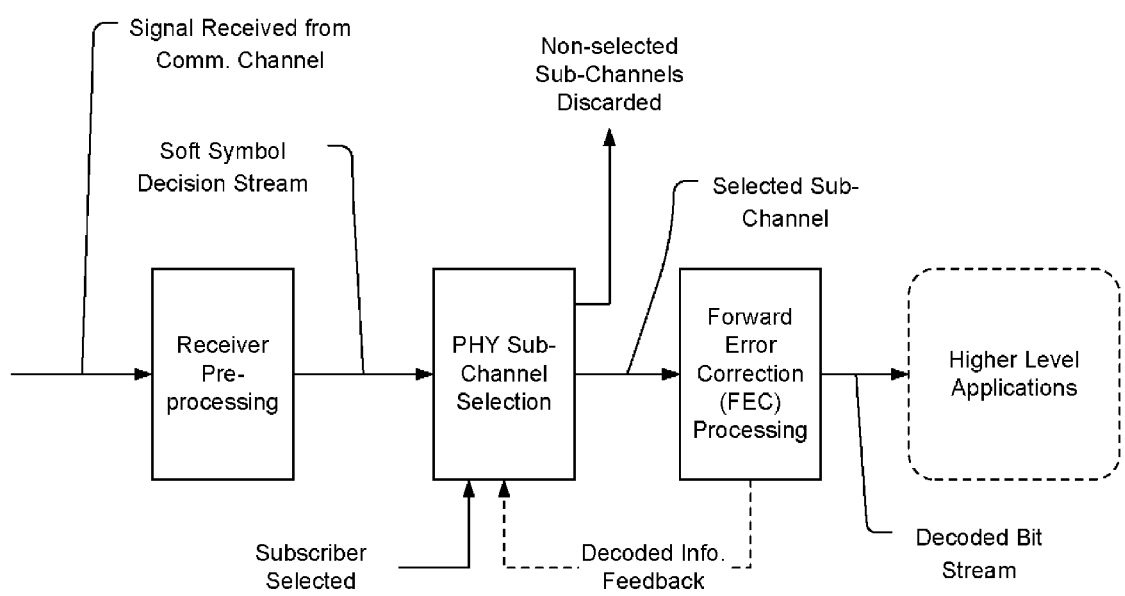
FIG. 11 is a diagram illustrating an embodiment of physical layer (PHY) sub-channel processing functionality that is supported according to the present invention.

FIG. 11 is a diagram illustrating an embodiment of physical layer (PHY) sub-channel processing functionality that is supported according to the present invention. A signal is received from a communication channel. The communication channel may be a wired (or wireline) or wireless communication channel without departing from the scope and spirit of the invention. The received signal undergoes receiver pre-processing that may include: performing tuning to a particular frequency band, performing carrier frequency recovery, digital sampling using an analog to digital converter (ADC), generating I,Q inputs from a received sampled signal, and generating a stream of soft symbol decisions. The stream of soft symbol decisions is output from the receiver pre-processing functional block and is provided to a PHY sub-channel selection functional block. The selection of the sub-channels within this functional block may be performed as directed by a user (or subscriber) that employs a receiver supporting the functionality of the FIG. 11. Alternatively, the selection of the sub-channels within this functional block may be performed as directed by decoded information that is fed back from a forward error correction (FEC) processing functional block.

The selected sub-channel is provided to the FEC processing functional block from the PHY sub-channel selection functional block. The FEC processing functional block performs the actual decoding of stream of soft symbol decisions provided by the receiver pre-processing functional block that have been selected and assigned to a sub-channel within the PHY sub-channel selection functional block. In embodiments where a training field has been encoded and transmitted to a receiver, the FEC processing functional block decoded this coded training field (CTF) for use in decoding subsequent soft symbols within the stream of soft symbol decisions. The CTF may be coded to include a variety of different types of information for use in decoding and processing subsequent soft symbols. Various embodiments of which types of information may be included therein are described in more detail below.

The output of the FEC processing functional block is a decoded bit stream that may be provided to any one of a variety of higher level applications. This decoded bit stream may be viewed as being the hard decisions that are generated from the soft symbol decisions that are output from the receiver pre-processing functional block. These are the best estimates of the data that has been encoded and transmitted to the receiver that supports the PHY sub-channel processing functionality shown and described in the FIG. 11.

The PHY sub-channel selection functional block substantially reduces the total amount of data that the FEC processing functional block must process and decode. In doing this, the PHY sub-channel selection functional block selectively feeds data to the FEC processing functional block. Only the received data that is destined, or intended, for a particular receiver then undergoes the full processing and decoding. Whereas in previous prior art implementations, all of the received data is processed and only at the higher levels is the fully decoded data discerned as whether it is intended for this particular receiver. The PHY sub-channel selection functional block greatly reduces the processing of receives data by a receiver by enabling the selection of the data to be pushed back into the physical layer (PHY), rather than being performed at a higher layer (such as at a medium access control (MAC) layer). It is noted that the invention also includes encoding the information n such a way that the data is encoded, at a transmitter end of a communication channel, into such a symbol sequence that data may be extracted using one or more of the PHY sub-channel processing techniques described herein.

Figure 12:
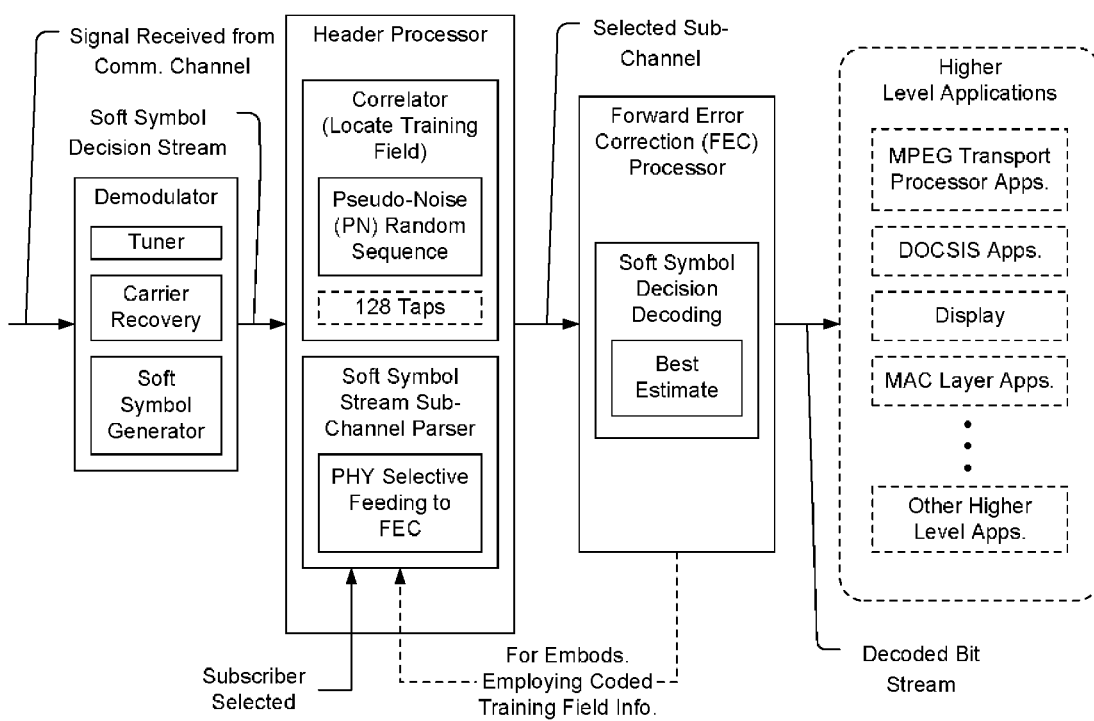
FIG. 12 is a diagram illustrating an embodiment of a receiver arranged to support PHY sub-channel processing according to the present invention.

FIG. 12 is a diagram illustrating an embodiment of a receiver arranged to support PHY sub-channel processing 1200 according to the present invention. A signal is received from a communication channel. This received signal is provided to a demodulator that performs tuning, carrier frequency recovery, and employs a soft symbol generator to generate a soft symbol decision stream from the received signal. In addition, the demodulator may be viewed as performing the necessary functions to support the generation of the soft symbol decision stream, including performing digital sampling of the received signal, extraction of the I,Q components of the received signal, performing any down-converting and filtering to get the received signal down to a baseband signal thereby being available for the PHY sub-channel processing of the invention.

The soft symbol decision stream is provided to a header processor. The header processor locates a training field within the soft decision stream. In doing so, the header processor employs a correlator in one embodiment. This correlator may be implemented using a pseudo-noise (PN) random sequence and a 128 tap filter. The correlator scans the soft symbol decision stream to locate the training field. Again, it is noted that this training field, when coded to be a CTF, is decoded and then identified as being the training field.

The header processor also includes a soft symbol decision stream sub-channel parser that performs the functionality to select the appropriate soft symbols of the soft symbol decision stream that are to be assigned and provided to a FEC correction processor via a sub-channel. The soft symbol decision stream sub-channel parser enables selective feeding of symbols of the soft symbol decision stream to the FEC correction processor. It is also noted that this embodiment allows a subscriber to direct the selection of the sub-channel made by the soft symbol decision stream sub-channel parser. Alternatively, information extracted from a decoded CTF is fed back to the soft symbol decision stream sub-channel parser, within the header processor, to direct the selection of a subsequent sub-channel to be provided to the FEC correction processor.

The FEC correction processor performs the actual decoding of the selected symbols provided to it by the header processor via a sub-channel. Only the soft symbol decisions within this sub-channel need be decoded by the FEC processor. The FEC processor, in performing soft symbol decision decoding, generates the best estimate of the soft symbol decisions. This may be viewed as generating hard decisions corresponding to these soft symbol decisions. Again, when a CTF is provided to the receiver that is arranged to include the functionality and components of the FIG. 12, then the CTF may be decoded in a similar way that data is decoded. The information extracted from the CTF is then fed back to the header processor to assist in the direction of decoding of subsequent soft symbols of the received soft symbol decision stream.

The now decoded bit stream, provided from the FEC processor, may then be provided to one or more higher level applications. For example, this bit stream may be provided for use in MPEG-2 transport processor applications, DOCSIS (Data Over Cable Service Interface Specification) applications, display applications, medium access control (MAC) applications, . . . , and any number of other higher level applications as well.

The embodiment of the FIG. 12 shows yet another embodiment where PHY sub-channel processing may be achieved according to the invention. As can be seen, by performing the selective feeding of only the required portions of the received data to the FEC processor, a great deal of unnecessary processing of data may be avoided altogether. The PHY sub-channel processing performs selection of the appropriate data to be processed by the FEC processor in the physical layer rather than in the MAC layer (or some other higher layer). This may result in great hardware and processing savings within a receiver that implements the PHY sub-channel processing shown in the FIG. 12.

Figure 13:
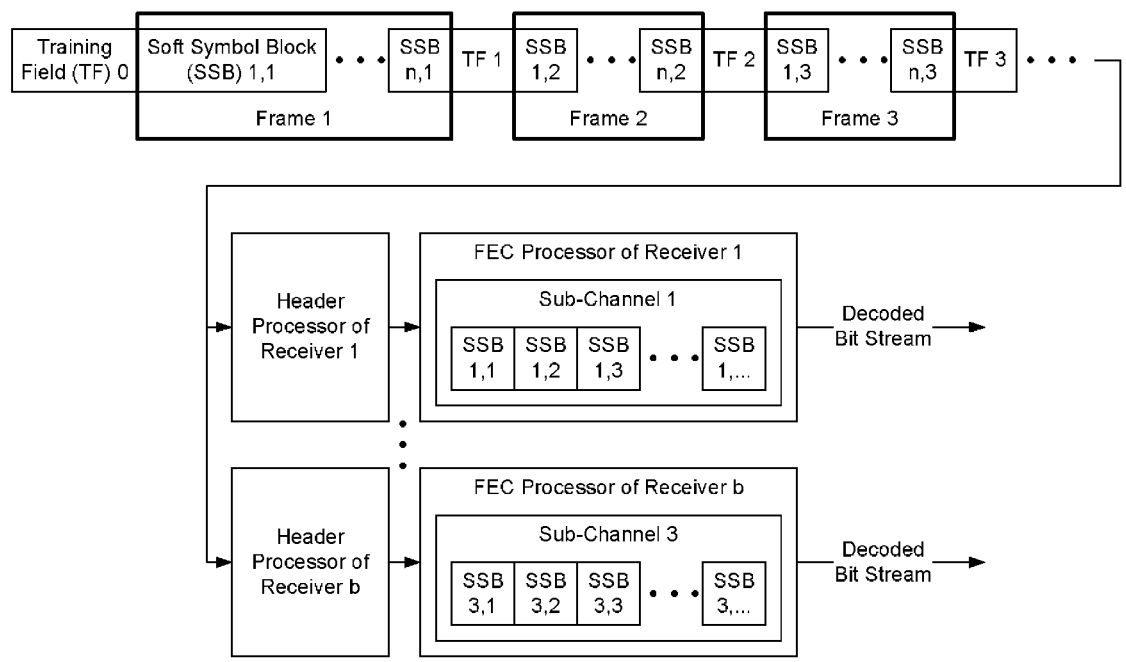
FIG. 13 is a diagram illustrating an embodiment of PHY sub-channel processing that is performed according to the present invention.

FIG. 13 is a diagram illustrating an embodiment of PHY sub-channel processing that is performed according to the present invention. The top of the FIG. 13 shows an incoming soft symbol decision stream. This soft symbol decision stream, provided from a receiver pre-processing functional block, is provided to a header processor. The soft symbol decision stream includes a number of training fields interposed between symbol frames; in this embodiment, the training fields are not coded training fields (CTFs). Each of the symbol frames includes one or more soft symbol blocks (SSBs). Each of the SSBs includes one or more actual soft symbols, and each of the soft symbols is composed of one or more digital bits. The invention is operable to support a variety of code rates that may be implemented using a variety of modulations (constellations and mappings) as will be described in various embodiments below as well.

The same soft symbol decision stream may be generated within receiver pre-processing of a variety of receivers, shown in this embodiment as a receiver 1, . . . , and a receiver b. In the other embodiments described herein that show only a single receiver embodiment, it is understood that multiple receivers may similarly be arranged to receive a common broadcast signal provided to the multiple receivers.

A header processor of receiver 1 receives the soft symbol decision stream and selectively generates a sub-channel 1 and selectively feeds it to an FEC processor of the receiver 1. The FEC processor of the receiver 1 then generates a decoded bit stream that corresponds to the SSBs that have been used to generate the sub-channel 1. The selection of these particular SSBs, to generate the sub-channel 1 for the receiver 1, is based on the selection provided to the header processor of the receiver 1. This external direction to perform the selection may be provided by a subscriber in this embodiment. To illustrate the functionality of the PHY sub-channel processing supported in this embodiment, we may look at the selection of the SSBs from the soft symbol decision stream to generate the sub-channel 1 within the receiver 1. The selection within the header processor of the receiver 1 selects the first SSB following a training field within each frame. These selected first SSBs of each frame of the soft symbol decision stream are then provided to the FEC processor of the receiver 1 as a sub-channel 1. This represents only a portion of the total received data within the soft symbol decision stream. However, this selection of only a portion of the soft symbol decision stream, specifically a selection of only some of the SSBs contained therein, substantially reduces the total processing to be performed by the FEC processor of the receiver 1.

The operation of the receiver b is also shown to illustrate how the selection of SSBs from the soft symbol decision stream may be made when a header processor of another receiver is directed to select another SSB from each of the frames of the soft symbol decision stream. In this embodiment shown in the FIG. 13, the header processor of the receiver b selects the third SSB from each frame and uses those SSBs to genera a sub-channel 3 to be processed by a FEC processor of the receiver b.

The operation within the FIG. 13 shows how each of the SSBs within the various frames of the soft symbol decision stream may be associated with a sub-channel. For example, the first SSB of each frame may be used to generate a sub-channel 1; the second SSB of each frame may be used to generate a sub-channel 2; . . . ; and (in general) the nth SSB of each frame may be used to generate a sub-channel n. This embodiment shows how there may be n SSBs within each frame of the soft symbol decision stream. In performing the PHY sub-channel processing according to the invention, only those SSBs containing information that is requested by a particular receiver need to be decoded. The non-selected SSBs of the frames may be discarded and unused until the selection of the receiver is changed.

For example, at one instant in time, the receiver 1 may select the information contained within the first SSBs of the frames of the soft symbol decision stream. Then, at a later instant in time, the receiver 1 may then select the information contained within the third SSBs of the frames of the soft symbol decision stream. In such a case, the header processor of the receiver 1 would then switch its selection of the third SSBs of the frames of the soft symbol decision stream thereby generating the sub-channel 3.

Figure 14:
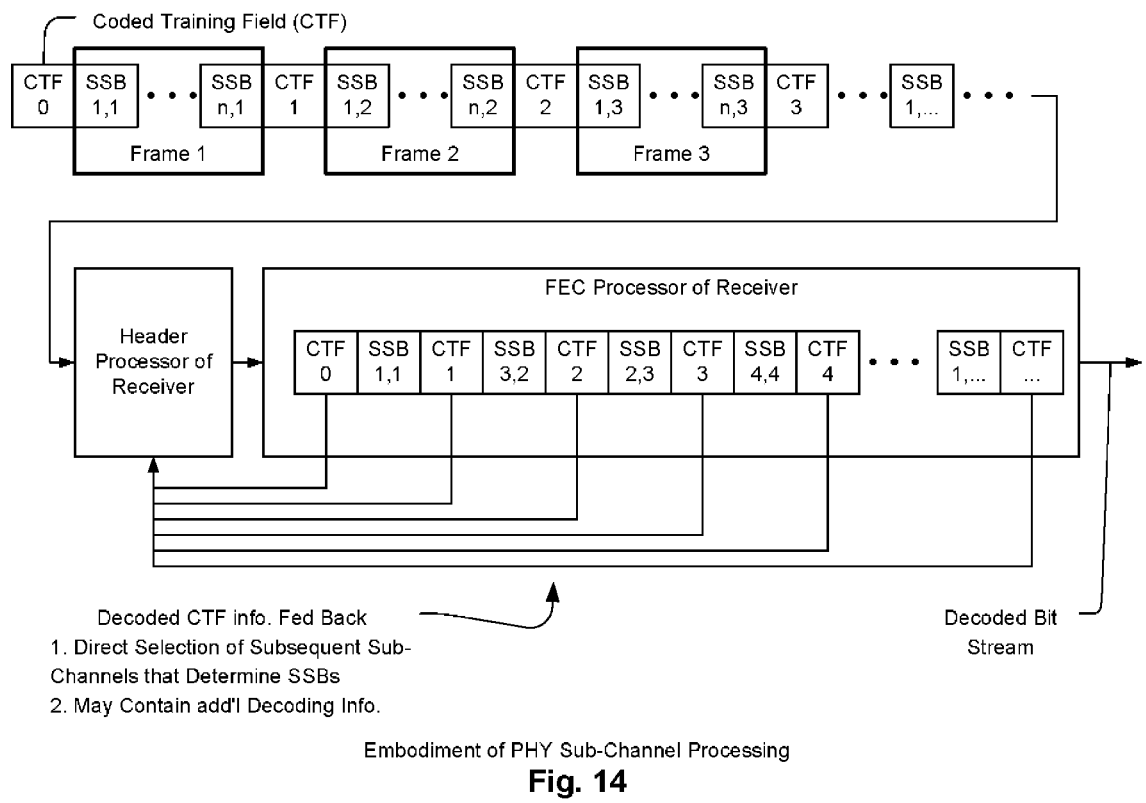
FIG. 14 is a diagram illustrating another embodiment of PHY sub-channel processing that is performed according to the present invention.

FIG. 14 is a diagram illustrating another embodiment of PHY sub-channel processing that is performed according to the present invention. The top of the FIG. 14 shows an incoming soft symbol decision stream. This soft symbol decision stream, provided from a receiver pre-processing functional block, is provided to a header processor. The soft symbol decision stream includes a number of coded training fields (CTFs) interposed between symbol frames. Each of the symbol frames includes one or more soft symbol blocks (SSBs). Each of the SSBs includes one or more actual soft symbols, and each of the soft symbols is composed of one or more digital bits. The invention is operable to support a variety of code rates that may be implemented using a variety of modulations (constellations and mappings) as will be described in various embodiments below as well.

The FIG. 14 shows how a header processor of a receiver may selectively and dynamically change the selection of the SSB to be selected from various frames of a soft symbol decision stream when performing decoding of data contained within the soft symbol decision stream.

For example, an FEC processor of the receiver decoded a CTF 0 to extract the information contained therein. This information is then fed back to the header processor of the receiver to direct the selection of the SSB of a subsequent frame of the soft symbol decision stream. In addition, the CTFs may also include additional information that may be employed to direct the decoding of subsequent SSBs of the soft symbol decision stream.

In one embodiment, the information extracted from the CTF 0 s used to direct the selection of the SSB from the following frame of the soft symbol decision stream. In the embodiment of the FIG. 13, the information extract from the CTF 0 is used to direct the header processor to select the SSB 1,1 from the frame 1. Then, after the FEC processor of the receiver decodes the CTF 1 that follows the frame 1, the information extracted there from is used to direct the header processor to select the SSB 3,2 from the frame 2 (or the third SSB within the frame 2). Continuing on, after the FEC processor of the receiver decodes the CTF 2 that follows the frame 2, the information extracted there from is used to direct the header processor to select the SSB 2,3 from the frame 3 (or the second SSB within the frame 3). This header processor may continue on to enable the dynamic selection of the appropriate SSB from subsequent frames within the soft symbol decision stream based on information extracted from the CTFs.

The look ahead of the selection may also be variable, for example, a CTF may include information directing how to select the appropriate SSB from the very next frame of the soft symbol decision stream; alternatively, the a CTF may include information directing how to select the appropriate SSB from the $2^{nd}$ next frame of the soft symbol decision stream, or the appropriate SSB from the nth next frame. This embodiment if illustrated in more detail on the FIG. 15.

Figure 15:
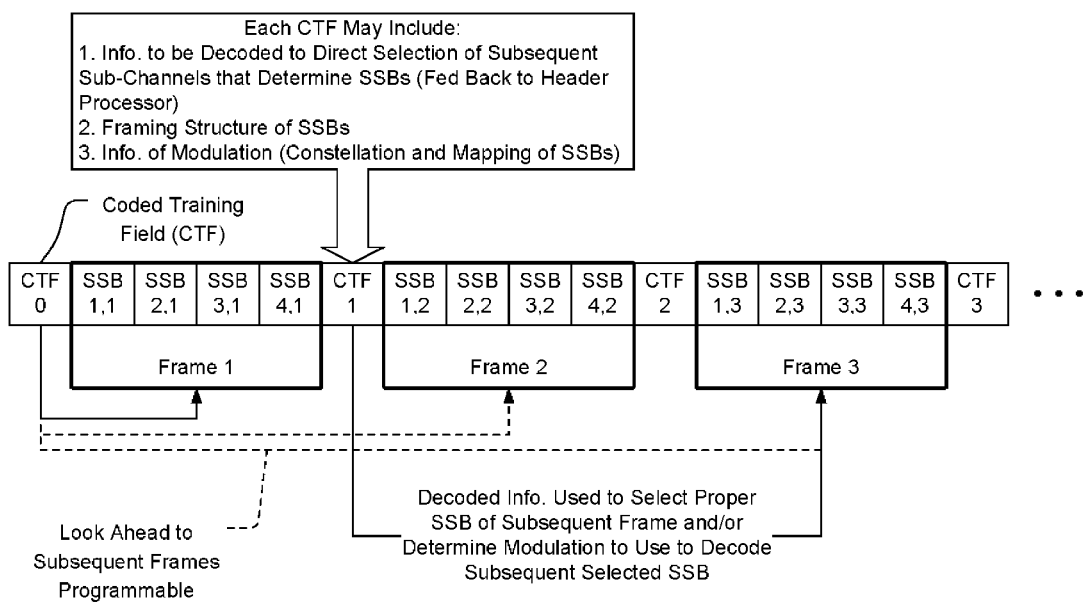
FIG. 15 is a diagram illustrating an embodiment of information coded within soft symbol blocks of a sub-channel and programmable look ahead to subsequent frames according to the invention.

FIG. 15 is a diagram illustrating an embodiment of information coded within soft symbol blocks of a sub-channel and programmable look ahead to subsequent frames according to the invention. A soft symbol decision stream including a number of CTFs interposed between frames of SSBs is received. Each of the CTFs may include one or more of the following: information to be decoded to direct selection of subsequent SSBs (to generate subsequent sub-channels), the framing structure of the SSBs (that governs the number of SSBs per frame, etc.), and/or information of modulation (constellation and mapping) of the individual symbols of the SSBs. This modulation information may be used to support decoding of symbols coding using various code rates. The modulation information may be extracted to direct an FEC processor to employ the appropriate modulation (constellation and mapping) when performing the decoding.

As shown in the FIG. 15, the look ahead may be variable. For example, the information extracted from the CTF 0 may be associated with frame 1, with frame 2, and/or with frame 3. There may be a number of reasons where the look ahead may be vary including the processing speed and capability of the receiver. As an example, when a receiver has sufficient speed to process a CTF and employ the extracted information contained therein to direct the processing of the very next frame, then the information within the CTF 0 may be used to direct the selection and decoding of the SSBs within the frame 1. However, when the receiver is unable to extract the information from a CTF and feed that information back to a header processor to direct the selection and decoding of the very next frame of a soft symbol decision stream, then the look ahead may apply this information to subsequent frames.

Figure 16:
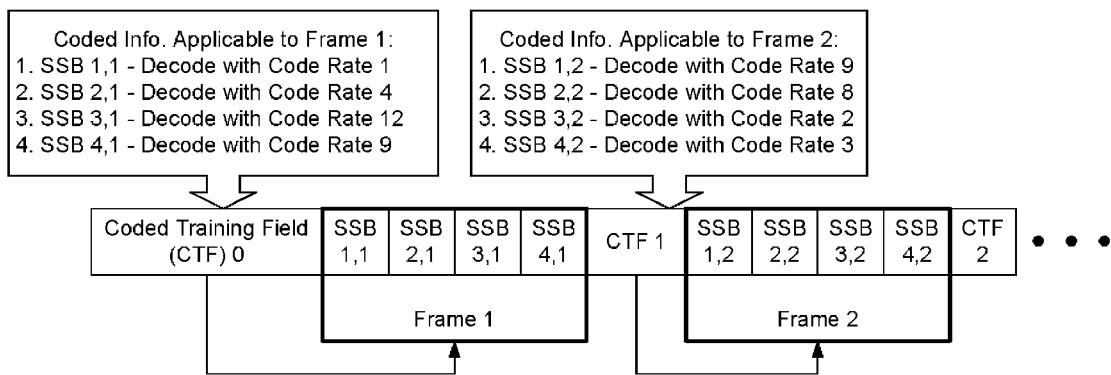
FIG. 16 is a diagram illustrating an embodiment of information coded within soft symbol blocks of a sub-channel according to the invention.

FIG. 16 is a diagram illustrating an embodiment of information coded within soft symbol blocks of a sub-channel according to the invention. The FIG. 16 shows a particular embodiment of how information contained within CTFs may be used to direct the decoding of the immediately following frames that each contains four SSBs. Clearly, this may also be extendible to direct the decoding of the frames that follow even further down the soft symbol decision stream as well. However, this embodiment shows how the information coded within a CTF is associated with a following frame to illustrate this aspect of the PHY sub-channel processing in general. This embodiment shows how the information is associated with how to decode the individual SSBs within the frame. The selection of which SSB to use to generate a sub-channel may be performed using any of the various embodiments described herein. In addition, is it also noted that the information extracted from the CTF may also include information of how to decode the individual symbols of the SSBs within the frames of the soft symbol decision stream. For example, different soft symbols within an SSB may have each been coded using a different code rate.

The CTF 0 includes information of how to decode each of the SSBs within the frame 1. In this embodiment, the SSB 1,1 of the frame 1 is to be decoded using a code rate 1. Similarly, the SSB 2,1 of the frame 1 is to be decoded using a code rate 4; the SSB 3,1 of the frame 1 is to be decoded using a code rate 12; and the SSB 4,1 of the frame 1 is to be decoded using a code rate 9. The code rates direct which modulation (constellation and mapping) is to be used to decode one or more of the symbols within the SSB.

Similarly, the CTF 1 includes information of how to decode each of the SSBs within the frame 2. In this embodiment, the SSB 1,2 of the frame 2 is to be decoded using a code rate 9. Similarly, the SSB 2,2 of the frame 2 is to be decoded using a code rate 8; the SSB 3,2 of the frame 2 is to be decoded using a code rate 2; and the SSB 4,2 of the frame 2 is to be decoded using a code rate 3. Again, the code rates direct which modulation (constellation and mapping) is to be used to decode one or more of the symbols within the SSB.

Figure 17:
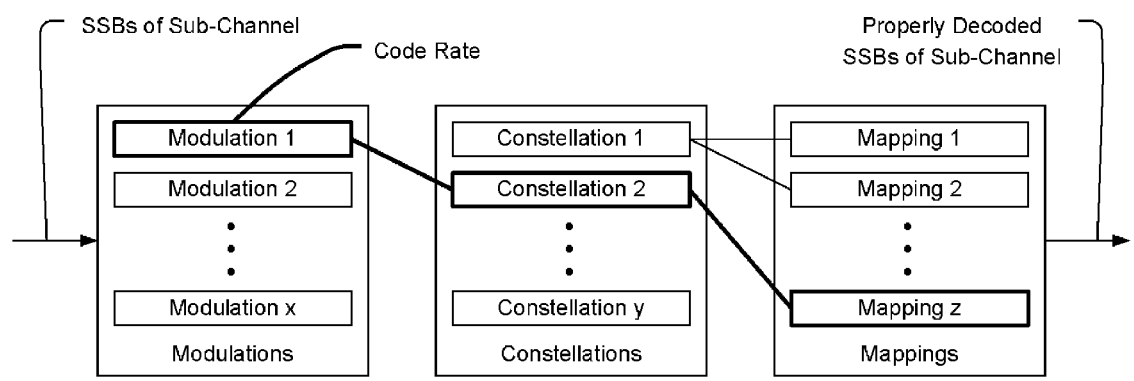
FIG. 17 is a diagram illustrating an embodiment of code rates that are employed to decode soft symbol blocks of sub-channels according to the invention.

FIG. 17 is a diagram illustrating an embodiment of code rates that are employed to decode soft symbol blocks of sub-channels according to the invention. Each code rate is associated with a modulation that has a constellation and a mapping for that constellation; this relationship may be ascertained when following through the FIG. 17. The FIG. 17 shows how a code rate invokes a modulation (selected from a number of modulations) and how each of the modulations is associated with a constellation and a mapping. As the SSBs of a soft symbol decision stream are provided via a sub-channel, they are then matched up with an appropriate code rate. Therein, the code rate directs which modulation (constellation and mapping) are to be used to decode the symbols contained therein. Again, is it noted that the code rate may direct different symbols within the SSB to be decoded using different modulations (constellations and mappings) as well. By employing the appropriate modulations (constellations and mappings) to the symbols within an SSB, then properly decoded SSBs of the sub-channel may be generated.

Looking at one example within the FIG. 17, looking at the code rate of the FIG. 17, a modulation #1 is selected from a number of available modulations. This modulation #1 corresponds to a constellation #2, selected from a number of available constellations, and a mapping #z of the constellation #2. It is noted that a single constellation type may employ different mappings in different code rates.

There are a variety of constellation types employed by modulations as known in the art, and the invention is extendible to any of these. Some modulation examples include BPSK (Binary Phase Shift Keying), QPSK (Quadrature Phase Shift Keying), PSK (Phase Shift Keying), QAM (Quadrature Amplitude Modulation), APSK (Amplitude Phase Shift Keying), and variants thereof including 8 PSK, and higher orders of PSK, 16 QAM, and higher orders of QAM, among other types of modulations.

Figure 18:
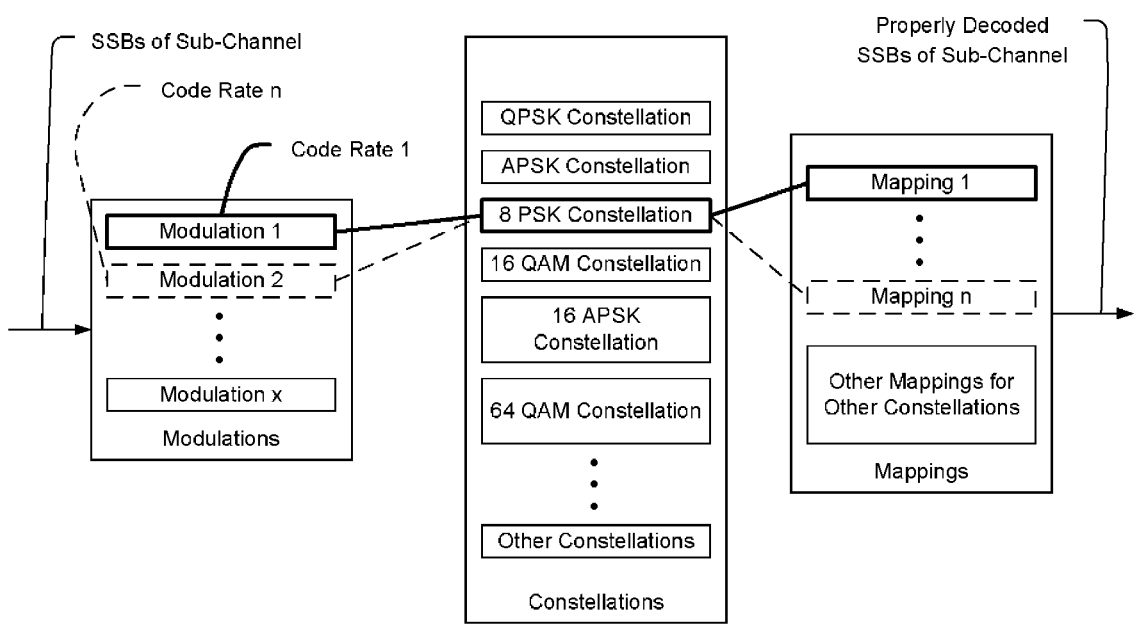
FIG. 18 is a diagram illustrating an embodiment of code rates employed to decode soft symbol blocks according to the invention.

FIG. 18 is a diagram illustrating an embodiment of code rates employed to decode soft symbol blocks according to the invention. The FIG. 18 shows a specific embodiment of the FIG. 17. We look at two different code rates, code rate 1 and code rate n, and determine which modulation (constellation and mapping) each of them are to use when decoding a symbol.

We will look at two different code rates that each employs 8 PSK type constellations. Looking first at the code rate 1, the modulation #1 is selected from a number of available modulations. The modulation #1 is associated with an 8 PSK type constellation, and the code rate 1 employs a mapping #1 of its 8 PSK type constellation. Looking at the code rate n, which also employs an 8 PSK type constellation, the modulation #2 is selected, the 8 PSK constellation type is selected, and a mapping #n of its 8 PSK type constellation is employed. For an even clear understanding of this functionality, we look now to FIG. 19 that shows some possible mappings to be employed by the code rate 1 and n.

Figure 19:
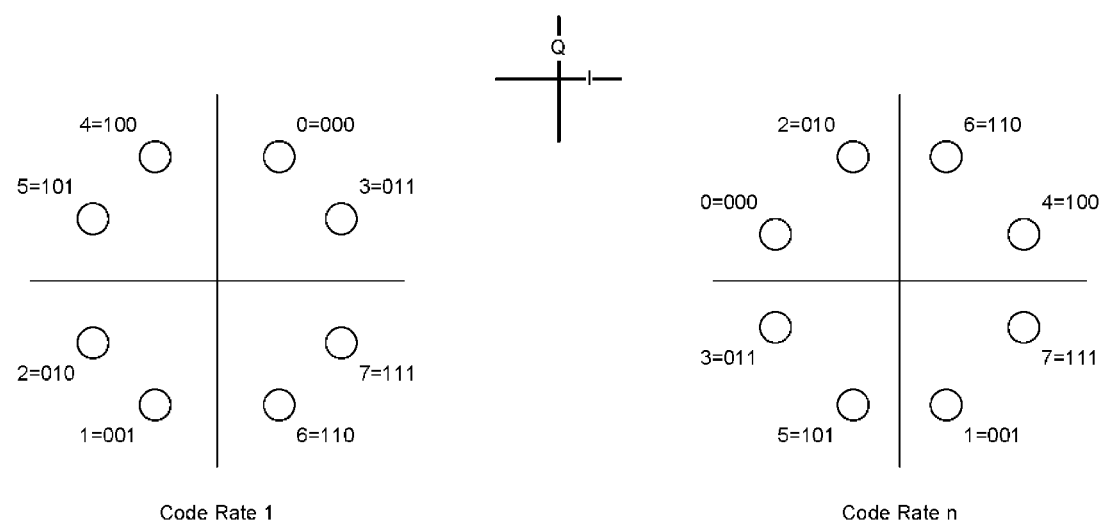
FIG. 19 is a constellation diagram illustrating an embodiment of modulations (constellations and mappings) for code rates 1 and n shown in FIG. 18.

FIG. 19 is a constellation diagram illustrating an embodiment of modulations (constellations and mappings) for code rates 1 and n shown in FIG. 18. The FIG. 19 shows 8 PSK type constellations that may be employed according to the invention. Each of the constellation points within these two constellations has different amplitudes. However, identical constellations may be used without departing from the scope and spirit of the invention as well (when all of the constellations for code rate 1 and code rate n have the same magnitude). The FIG. 19 shows how the 3 bit symbols, employed within 8 PSK, may be used to provide different mappings to constellation points located in the same general vicinity of the I,Q plane. This embodiment of employing 8 PSK is shown here specifically, yet it is understood that other code rates, perhaps employing different modulations (constellations and mappings) may similarly be used according to the invention.

Figure 20:
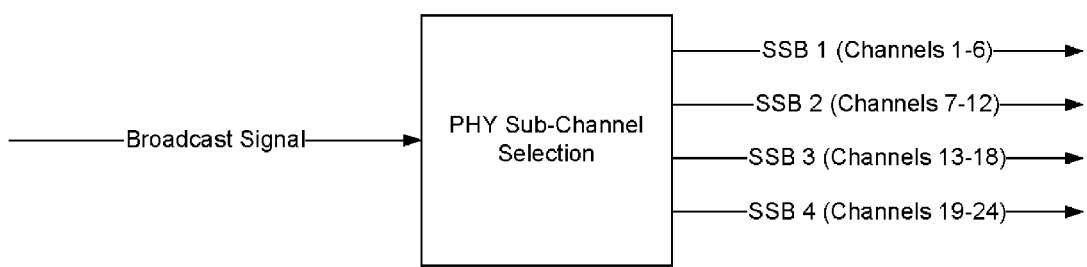
FIG. 20 is a diagram illustrating an embodiment of PHY sub-channel selection of a video broadcast signal according to the invention.

FIG. 20 is a diagram illustrating an embodiment of PHY sub-channel selection of a video broadcast signal according to the invention. A single broadcast signal is received by a PHY sub-channel selection functional block. In this embodiment, the broadcast signal includes video information for channels 1-24 that may be extracted and played back by a user. The PHY sub-channel selection functional block parses the received broadcast signal into a number of sub-channels. The first SSB (SSB 1) of each frame is used to generate the sub-channel that carries the information contained within the video channels 1-6 of the broadcast signal; this sub-channel may be viewed as being a group of information channels. In this situation, these information channels are video information channels. The second SSB (SSB 2) of each frame is used to generate the sub-channel that carries the information contained within the video channels 7-12 of the broadcast signal. Similarly, the third SSB (SSB 3) of each frame is used to generate the sub-channel that carries the information contained within the video channels 13-18 of the broadcast signal; and fourth SSB (SSB 4) of each frame is used to generate the sub-channel that carries the information contained within the video channels 19-24 of the broadcast signal.

Again, each of the sub-channels that carry the video information of the video channels 1-6, 7-12, 13-18, and 19-24, respectively, may be viewed as containing a group of information channels. Clearly, the inventive concept of partitioning of a broadcast video signal into a number of sub-channels, where each sub-channel may include a number of video information channels, may also be extended to media beyond only video signals. As one example, an audio signal may similarly be partitioned into a number of sub-channel where each sub-channel may include a number of audio information channels contained therein.

The FIG. 20 shows how a multitude of information may still be carried on each of the sub-channels according to the invention. However, the parsing performed by the PHY sub-channel selection functional block greatly reduces the total amount of information that needs to be processed to extract the information for, say, channel 1. Rather than tuning to and decoding the entire broadcast signal, and then filtering out only the selected information corresponding to the channel 1, the tuning need only be performed on the sub-channel 1. In this embodiment, there is a reduction of processing by a factor of 4. The sub-channel 1, including the first SSB (SSB 1) of each frame and information contained within the channels 1-6 of the broadcast signal), may then be decoded and filtered to extract the information contained within the channel 1.

The FIG. 20 is shown specifically in the context of a video broadcast signal application; however, the PHY sub-channel processing is clearly extendible to other signal types as well including data and audio, among other signal types.

Figure 21:
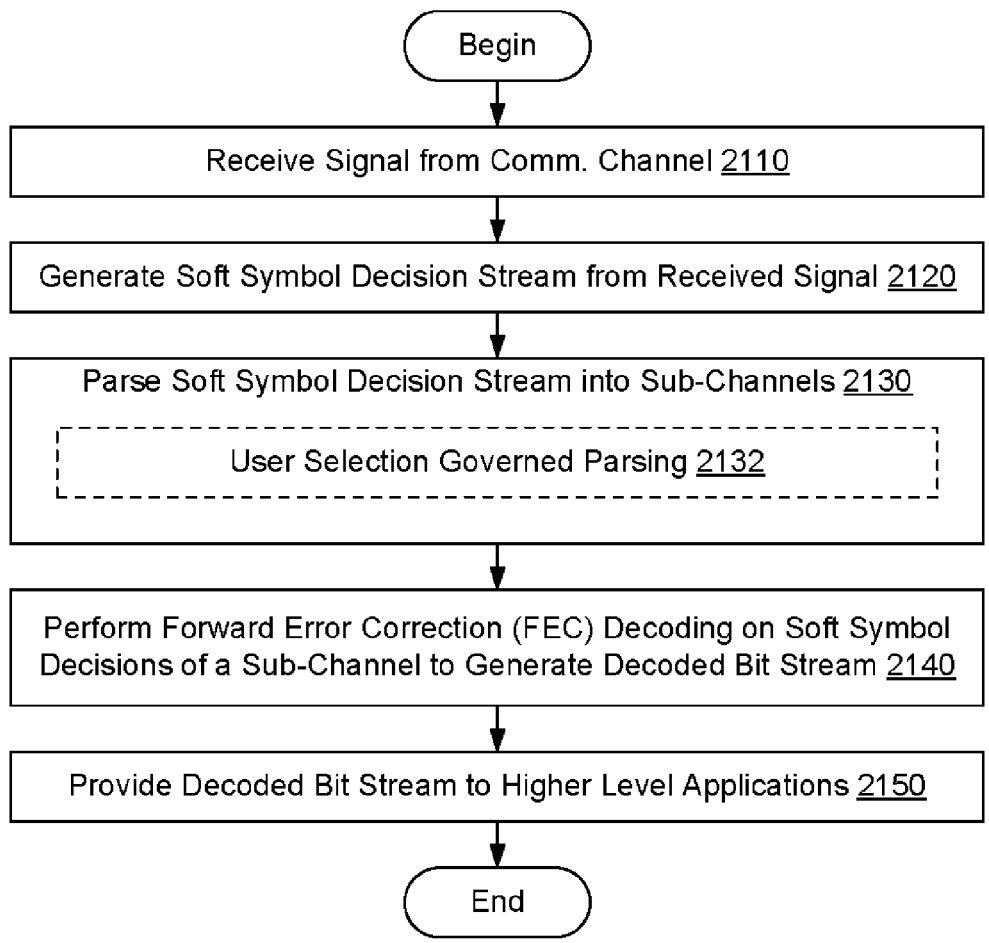
FIG. 21 and FIG. 22 are operational flow diagrams illustrating embodiments of sub-channel processing methods that are performed according to the present invention.

FIG. 21 is an operational flow diagram illustrating an embodiment of a sub-channel processing method 2100 that is performed according to the present invention. In a block 2120, a signal is received from a communication channel. In a block 2120, a soft symbol decision stream is generated from the received signal. In a block 2130, the soft symbol decision stream is parsed into one or more sub-channels. This parsing may be directed as being performed by user selection, as shown in a block 2132.

Then, as shown in a block 2140, FEC decoding is performed on the soft symbol decisions of the sub-channel to generate a decoded bit stream. In a block 2150, this decoded bit stream may then be provided to one or more higher level applications.

Figure 22:
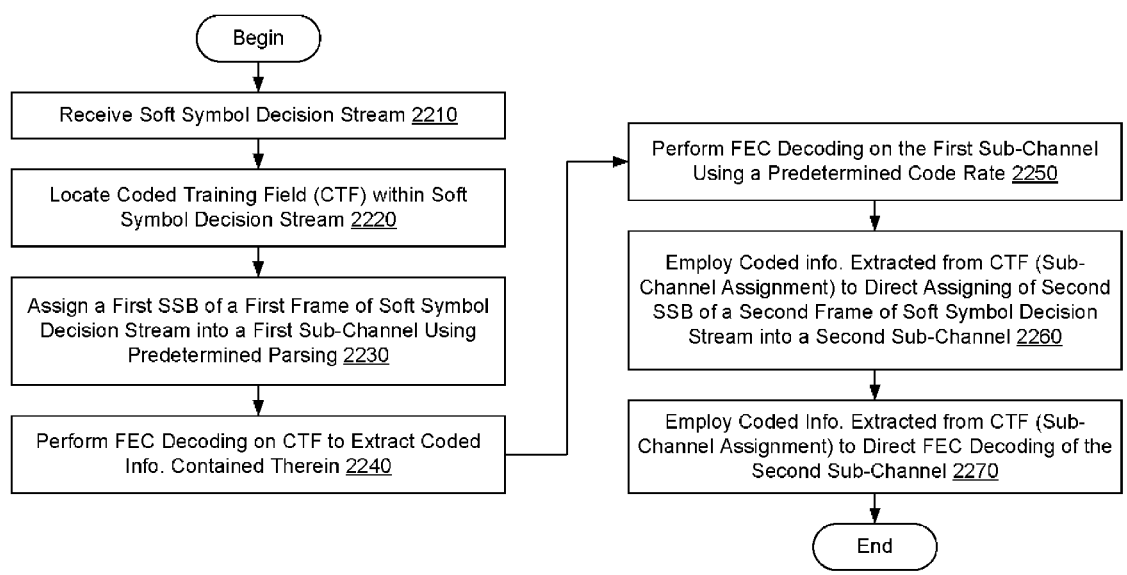

FIG. 22 is an operational flow diagram illustrating another embodiment of a sub-channel processing method 2200 that is performed according to the present invention. In a block 2210, a soft symbol decision stream is received. As shown in a block 2220, a coded training field (CTF) is located within the soft symbol decision stream. Within a block 2230, a first block of a first frame of the soft symbol decision stream is assigned into a first sub-channel using a predetermined assignment approach. FEC decoding is performed on the CTF, in a block 2240, to extract coded information contained therein. In a block 2250, FEC decoding is performed on the first sub-channel using a predetermined code rate.

After the CTF has been decoded and the information contained therein is available for use in assigning subsequent SSBs (of subsequent frames) into sub-channels and in decoding the subsequent SSBs of those subsequent frames. In a block 2260, the extracted coded information is employed to direct assigning of a second SSB of second frame of the soft symbol decision stream into a second sub-channel. In addition, in a block 2270, the extracted coded information is employed to direct FEC decoding of the second SSB of a second frame of the soft symbol decision stream into a second sub-channel.

In view of the above detailed description of the invention and associated drawings, other modifications and variations will now become apparent. It should also be apparent that such other modifications and variations may be effected without departing from the spirit and scope of the invention.

What is claimed is:

1. A communication device, comprising:
a processor that is operable to:
receive a sequence that includes a plurality of coded training fields interspersed among a plurality of frames;
decode a first coded training field thereby extracting a first plurality of parameters;
decode a first frame of the plurality of frames, that is subsequent to the first coded training field within the received sequence, using the first plurality of parameters thereby generating a first decoded bit;
decode a second coded training field thereby extracting a second plurality of parameters; and
decode a second frame of the plurality of frames, that is subsequent to the second coded training field within the received sequence, using the second plurality of parameters thereby generating a second decoded bit; and wherein:
the first plurality of parameters includes at least one of a first code rate and a first modulation indicating a first constellation having a corresponding first mapping by which at least one symbol within the first frame is to be decoded; and
the second plurality of parameters includes at least one of a second code rate and a second modulation indicating a second constellation having a corresponding second mapping by which at least one symbol within the second frame is to be decoded.

2. The communication device of claim 1, wherein:
the first coded training field is followed by the first frame;
the first frame is followed by the second coded training field; and
the second coded training field is followed by the second frame.

3. The communication device of claim 1, wherein:
the first coded training field is followed by the first frame; and
at least one additional frame is interposed between the first coded training field and the first frame.

4. The communication device of claim 1, wherein:
the first plurality of parameters includes the first modulation indicating the first constellation having the corresponding first mapping by which a first symbol within the first frame is to be decoded; and
the first plurality of parameters includes a third modulation indicating a third constellation having a corresponding third mapping by which a second symbol within the first frame is to be decoded.

5. The communication device of claim 1, wherein:
the first plurality of parameters includes the first modulation indicating the first constellation having the corresponding first mapping by which a first symbol within the first frame is to be decoded; and
the first plurality of parameters includes a third modulation indicating the first constellation having a corresponding third mapping by which a second symbol within the first frame is to be decoded.

6. The communication device of claim 1, wherein:
the first plurality of parameters includes the first code rate by which a first symbol within the first frame is to be decoded; and
the first plurality of parameters includes a third code rate by which a second symbol within the first frame is to be decoded.

7. The communication device of claim 1, further comprising:
a demodulator that is operable to:
receive a signal from a communication channel; and
process the received signal thereby generating a plurality of soft symbol decisions; and wherein:
the sequence received by the processor includes selected soft symbol decisions within the plurality of soft symbol decisions.

8. The communication device of claim 1, further comprising:
a demodulator that is operable to:
receive a signal from a communication channel; and
process the received signal thereby generating a first plurality of soft symbol decisions corresponding to a first sub-channel and a second plurality of soft symbol decisions corresponding to a second sub-channel; and
a header processor that is operable to select the first plurality of soft symbol decisions or the second plurality of soft symbol decisions thereby generating the sequence that is received by the processor.

9. The communication device of claim 1, wherein:
at least one of the first modulation and the second modulation is Amplitude Phase Shift Keying (APSK), Quadrature Phase Shift Keying (QPSK), 8 Phase Shift Keying (PSK), 16 Quadrature Amplitude Modulation (QAM), or 16 Amplitude Phase Shift Keying (APSK).

10. The communication device of claim 1, wherein:
the communication device is a satellite receiver, a high definition television (HDTV) set top box receiver, a mobile receiver, a base station receiver, a mobile unit, a receiver, or a transceiver.

11. A communication device, comprising:
a header processor that is operable to process a soft symbol stream thereby generating a sequence that includes a plurality of coded training fields interspersed among a plurality of frames;
a forward error correction processor that is operable to:
receive the sequence that includes the plurality of coded training fields interspersed among the plurality of frames;
decode a first coded training field thereby extracting a first plurality of parameters;
decode a first frame of the plurality of frames, that is subsequent to the first coded training field within the received sequence, using the first plurality of parameters thereby generating a first decoded bit;
decode a second coded training field thereby extracting a second plurality of parameters; and
decode a second frame of the plurality of frames, that is subsequent to the second coded training field within the received sequence, using the second plurality of parameters thereby generating a second decoded bit; and wherein:
the first plurality of parameters includes at least one of a first code rate and a first modulation indicating a first constellation having a corresponding first mapping by which at least one symbol within the first frame is to be decoded; and the second plurality of parameters includes at least one of a second code rate and a second modulation indicating a second constellation having a corresponding second mapping by which at least one symbol within the second frame is to be decoded.

12. The communication device of claim 11, wherein:
the header processor is operable to select a first plurality of soft symbol decisions or a second plurality of soft symbol decisions from the soft symbol stream thereby generating the sequence that includes the plurality of coded training fields interspersed among the plurality of frames.

13. The communication device of claim 11, wherein:
the first coded training field is followed by the first frame;
the first frame is followed by the second coded training field; and
the second coded training field is followed by the second frame.

14. The communication device of claim 11, wherein:
the first coded training field is followed by the first frame; and
at least one additional frame is interposed between the first coded training field and the first frame.

15. The communication device of claim 11, wherein:
the first plurality of parameters includes the first modulation indicating the first constellation having the corresponding first mapping by which a first symbol within the first frame is to be decoded; and
the first plurality of parameters includes a third modulation indicating a third constellation having a corresponding third mapping by which a second symbol within the first frame is to be decoded.

16. The communication device of claim 11, wherein:
the first plurality of parameters includes the first code rate by which a first symbol within the first frame is to be decoded; and
the first plurality of parameters includes a third code rate by which a second symbol within the first frame is to be decoded.

17. The communication device of claim 11, wherein:
the communication device is a satellite receiver, a high definition television (HDTV) set top box receiver, a mobile receiver, a base station receiver, a mobile unit, a receiver, or a transceiver.

18. A method, comprising:
receiving a sequence that includes a plurality of coded training fields interspersed among a plurality of frames;
decoding a first coded training field thereby extracting a first plurality of parameters;
decoding a first frame of the plurality of frames, that is subsequent to the first coded training field within the received sequence, using the first plurality of parameters thereby generating a first decoded bit;
decoding a second coded training field thereby extracting a second plurality of parameters; and
decoding a second frame of the plurality of frames, that is subsequent to the second coded training field within the received sequence, using the second plurality of parameters thereby generating a second decoded bit; and wherein:
the first plurality of parameters includes at least one of a first code rate and a first modulation indicating a first constellation having a corresponding first mapping by which at least one symbol within the first frame is to be decoded; and
the second plurality of parameters includes at least one of a second code rate and a second modulation indicating a second constellation having a corresponding second mapping by which at least one symbol within the second frame is to be decoded.

19. The method of claim 18, wherein:
the first plurality of parameters includes the first code rate and the first modulation indicating the first constellation having the corresponding first mapping by which a first symbol within the first frame is to be decoded; and
the first plurality of parameters includes a third code rate and a third modulation indicating a third constellation having a corresponding third mapping by which a second symbol within the first frame is to be decoded.

20. The method of claim 18, wherein:
the method is performed within a communication device; and
the communication device is a satellite receiver, a high definition television (HDTV) set top box receiver, a mobile receiver, a base station receiver, a mobile unit, a receiver, or a transceiver.

* * * * *